US008793479B2

(12) United States Patent
Yoder et al.

(10) Patent No.: US 8,793,479 B2
(45) Date of Patent: Jul. 29, 2014

(54) LOADING A PLURALITY OF APPLIANCES INTO A BLADE

(75) Inventors: Terrence Ladd Yoder, Granite Bay, CA (US); Dante Vitale, Colfax, CA (US); Ali Ezzet, Granite Bay, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 453 days.

(21) Appl. No.: 13/145,226

(22) PCT Filed: Jan. 29, 2009

(86) PCT No.: PCT/US2009/032482
§ 371 (c)(1),
(2), (4) Date: Jul. 19, 2011

(87) PCT Pub. No.: WO2010/087834
PCT Pub. Date: Aug. 5, 2010

(65) Prior Publication Data
US 2011/0276796 A1   Nov. 10, 2011

(51) Int. Cl.
*G06F 9/00* (2006.01)
(52) U.S. Cl.
USPC .................................. 713/2; 713/1; 713/100
(58) Field of Classification Search
None
See application file for complete search history.

(56) References Cited

U.S. PATENT DOCUMENTS

| 6,029,207 A | 2/2000 | Heninger |
| 6,854,009 B1 | 2/2005 | Hughes |
| 7,461,374 B1 * | 12/2008 | Balint et al. ................... 717/174 |
| 7,487,343 B1 * | 2/2009 | Insley et al. ....................... 713/1 |
| 2003/0018870 A1 | 1/2003 | Abboud et al. |
| 2004/0054883 A1 * | 3/2004 | Goodman et al. ................. 713/1 |
| 2004/0255110 A1 | 12/2004 | Zimmer et al. |
| 2005/0118991 A1 | 6/2005 | Koganti et al. |
| 2006/0164421 A1 | 7/2006 | Cromer et al. |
| 2008/0022148 A1 | 1/2008 | Barnea et al. |
| 2008/0147880 A1 | 6/2008 | Morris |
| 2009/0013168 A1 | 1/2009 | Kalman et al. |

FOREIGN PATENT DOCUMENTS

| CN | 101110951 A | 1/2008 |
| CN | 101232395 A | 7/2008 |
| EP | 1288779 | 3/2003 |
| EP | 1489498 | 12/2004 |

OTHER PUBLICATIONS

English translation (machine-generate) of Abstract from Chinese Patent Publication No. CN101110951A [retrieved on Oct. 8, 2013], Retrieved from the Internet: <http://worldwide.espacenet.com/publicationDetails/biblio?DB=worldwide.espacenet.com&II=0&ND=3&adjacent=true&locale=en_EP&FT=D&date=20080123&CC=CN&NR=101110951A&KC=A>.

(Continued)

*Primary Examiner* — Paul Yanchus, III

(57) ABSTRACT

A method for enabling a plurality of software appliances to be dynamically loaded onto a blade is described. During runtime and in response to receiving one or more sets of appliance loading instructions corresponding to one or more appliances, the one or more appliances is downloaded. Each appliance has a capability different from each other. The one or more appliances that are downloaded are stored at a first set of locations on a data store. Each of the first set of locations is different from each other. A first appliance of the one or more appliances that are stored is then installed at a second location on the data store. Then, the first appliance that is installed is booted on the blade.

16 Claims, 5 Drawing Sheets

(56) References Cited

OTHER PUBLICATIONS

English translation (machine-generate) of Abstract from Chinese Patent Publication No. CN101232395A [retrieved on Oct. 8, 2013], Retrieved from the Internet: <http://worldwide.espacenet.com/publicationDetails/biblio?DB=worldwide.espacenet.com&II=0&ND=3&adjacent=true&locale=en_EP&FT=D&date=20080730&CC=CN&NR=101232395A&KC=A>.

International Search Report, PCT/US2009/03248, Jul. 22, 2009.

Extended European Search Report, corresponding EP Application No. EP 09839407.5, May 8, 2012.

* cited by examiner

LOADING A PLURALITY OF APPLIANCES INTO A BLADE

FIELD

The field of the present invention relates to computing systems. More particularly, embodiments of the present invention relate to server blades.

BACKGROUND

Blade servers are widely used in datacenters to save space and improve system management. They are self-contained computer servers, designed for high density. Blade servers have many components removed for space, power and other considerations while still having all the functional components to be considered a computer.

One of the principal benefits of blade computing is that components are no longer restricted to the minimum size requirements of the standard server-rack configuration. For example, densities of a hundred computers per rack and more are achievable with the present blade systems. Furthermore, as more processing power, memory and I/O bandwidth are added to blade servers, they are being used for larger and more diverse workloads. Additionally, each blade of a blade server has its own software appliance coupled therewith, thereby allowing for hundreds of software appliances to comprise one blade server.

However, there exist many limitations to the current state of technology with respect to blade servers. For example, while a blade server may host hundreds of software appliances coupled with hundreds of blades therein, it is costly to manage the overwhelmingly large blade inventory associated with these software appliances.

BRIEF DESCRIPTION OF THE DRAWINGS

The accompanying drawings, which are incorporated in and form a part of this specification, illustrate embodiments of the present technology for enabling a plurality of appliances to be dynamically loaded onto a blade and, together with the description, serve to explain principles discussed below.

Figure 1:
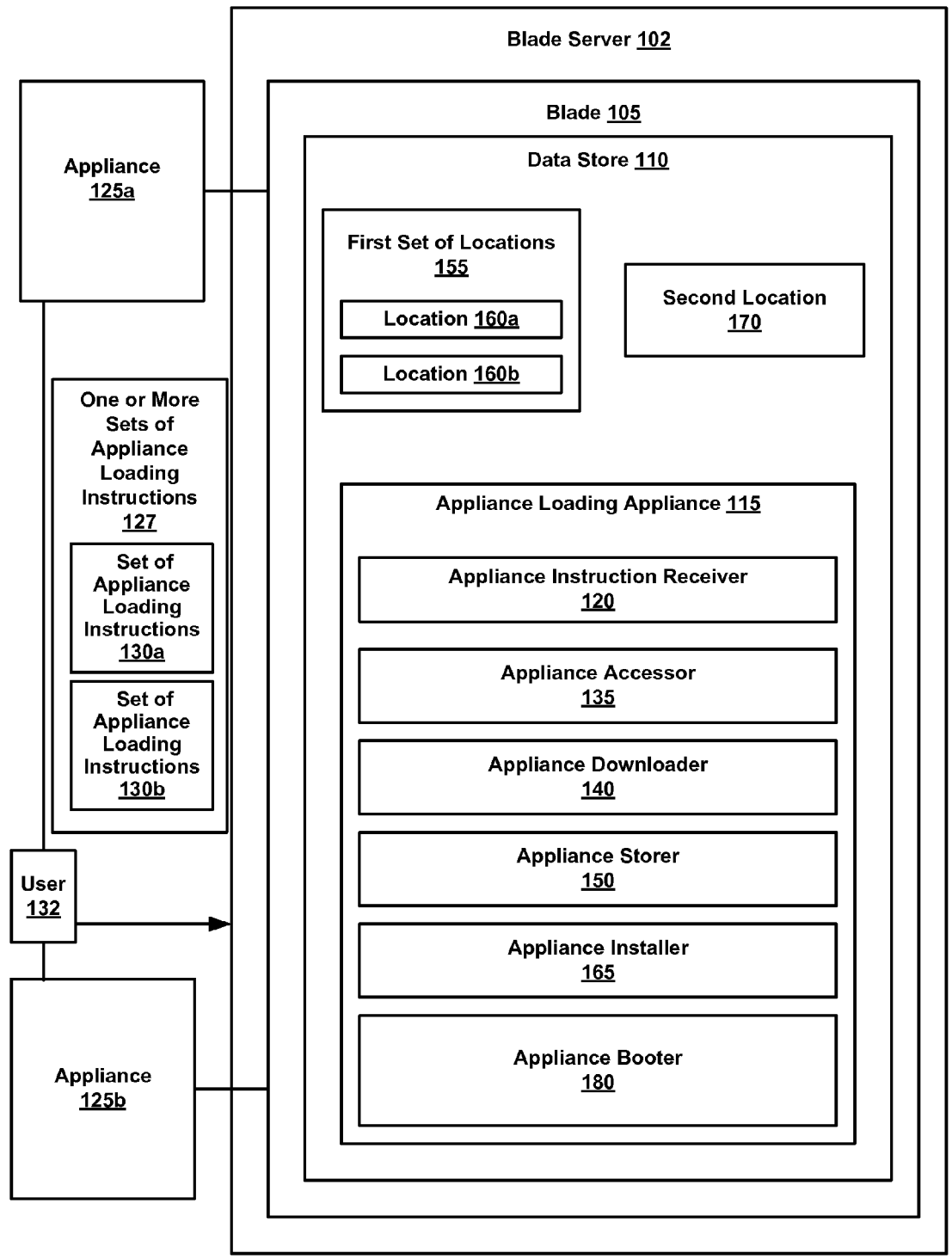
FIG. 1 is a block diagram of an example system for enabling a plurality of appliances to be dynamically loaded onto a blade, in accordance with embodiments of the present technology.

The drawings referred to in this description should not be understood as being drawn to scale unless specifically noted.

DESCRIPTION OF EMBODIMENTS

Reference will now be made in detail to embodiments of the present technology, examples of which are illustrated in the accompanying drawings. While the present technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following detailed description, numerous specific details are set forth in order to provide a thorough understanding of embodiment of the present technology. However, embodiments of the present technology may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present detailed description, discussions utilizing terms such as "downloading", "storing", "installing", "booting", "discontinuing", "re-booting", "uninstalling", "performing", "utilizing", or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. Embodiments of the present technology are also well suited to the use of other computer systems such as, for example, optical and mechanical computers.

Example Appliance Loading Appliance

Overview

Embodiments in accordance with the present technology pertain to a system for enabling a plurality of appliances to be dynamically loaded onto a blade. In one embodiment, the blade has an appliance loading appliance coupled therewith. The appliance loading appliance is a software application. This appliance loading appliance enables a plurality of software applications to be serially run on the blade.

This method of enabling a plurality of appliances to be dynamically loaded onto a blade decreases the current inventory management costs associated with blades. For example, each server may hold hundreds of blades. Each of these blades is dedicated to a specific and different appliance. These dedicated blades are warehoused until they are needed. Many resources, such as time, money, personnel, and real estate, are used to manage this blade inventory. Moreover, when the appliance on a dedicated blade is no longer wanted or needed, the dedicated blade is thrown out. Thus, having a single blade dedicated to a single appliance creates much waste.

However, embodiments of the present technology enable one blade to be dedicated to a plurality of different appliances. Furthermore, in one embodiment, a blade's function may be changed, or "re-purposed", by running a new appliance with a new capability on the blade, thereby replacing the original appliance. Thus, inventory management costs and waste are decreased by enabling the re-use of blades via enabling multiple appliances to serially run on a single blade.

More particularly, in one embodiment, the appliance loading appliance functions to receive instructions from a user to download, store, install, and serially run one or more appliances. The appliance loading appliance downloads the appliances and then stores them on the blade's hard disk drive. Next, the appliance loading appliance installs one of the downloaded appliances on a different part of the blade's hard disk drive. This installed appliance is then booted and run on the blade. By having its own operating system that is dedicated to loading other appliances on the blade, the appliance loading appliance enables a plurality of appliances having different capabilities and their own operating systems to serially run on a blade.

Example Architecture of Appliance Loading Appliance

FIG. 1 is a block diagram of an example appliance loading appliance (ALA) 115, in accordance with embodiments of the present technology. ALA includes appliance instruction receiver 120, appliance accessor 135, appliance downloader 140, appliance storer 150, appliance installer 165, and appliance booter 180.

Referring still to FIG. 1, in one embodiment ALA 115 is coupled with data store 110. Data store 110 is coupled with blade 105 on server 102. Data store 110 comprises the description herein of RAM 408 and/or data storage unit 412 of FIG. 4. In one embodiment, ALA 115 comprises an operating system.

In one embodiment, ALA 115 receives one or more sets of appliance loading instructions 127 from user 132. User 132 has access to the appliances, such as but not limited to appliances 125a and 125b shown in FIG. 1. The appliance loading instructions may be received via wire or wirelessly. For example, appliance loading instructions may be received via the Internet. While only appliances 125a and 125b are depicted in FIG. 1, it is understood that appliances 125a and 125b may represent any number of appliances. For purposes of brevity and clarity, when one or more appliances 125a and 125b are referenced, it is meant to refer to any number of appliances, unless noted otherwise.

Appliance loading instructions comprise instructions as to what appliances are to be downloaded, stored, installed, and eventually booted onto blade 105. While only two of the one or more sets of appliance loading instructions 127 are depicted in FIG. 1, such as set of appliance loading instructions 130a and 130b, it is understood that set of appliance loading instructions 130a and 130b may represent any number of sets of appliance loading instructions. For purposes of brevity and clarity, when set of appliance loading instructions 130a and 130b is referenced, it is meant to refer to any number of sets of appliance loading instructions, unless noted otherwise.

In one embodiment, appliances 125a and 125b are software applications and operating systems in which they run. Each appliance has a capability. A capability refers to a function of a software application, such as but not limited to, scanning for viruses, providing a variety of interfaces, recording a television show, etc.

As shown in FIG. 1, data store 110 includes a first set of locations 155 comprising locations 160a and 160b, and second location 170. Each location 160a, 160b, and 170 represents a separate space on data store 110. While only locations 160a and 160b of first set of locations 155 are depicted in FIG. 1, it is understood that there may be any number of locations within first set of locations 155. For purposes of brevity and clarity, when locations 160a and 160b are referenced, it is meant to refer to any number of locations, unless noted otherwise herein.

Figure 2:
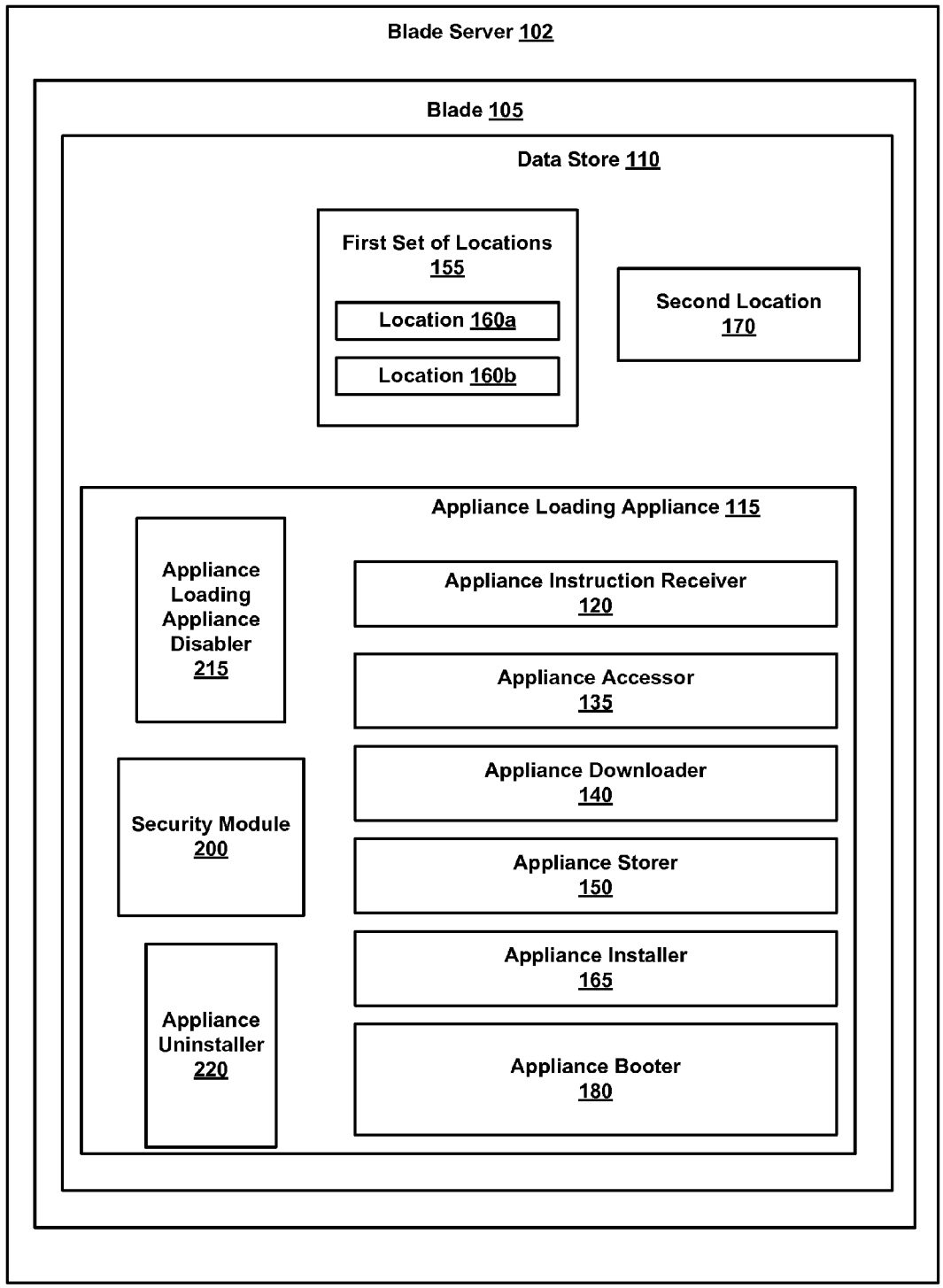
FIG. 2 is a block diagram of an example system for enabling a plurality of appliances to be dynamically loaded onto a blade, in accordance with embodiments of the present technology.

FIG. 2 is a block diagram of an example appliance loading appliance (ALA) 115, in accordance with embodiments of the present technology. In one embodiment, ALA 115 may further include security module 200, ALA disabler 215, and/or appliance uninstaller 220.

Example Operation of an Appliance Loading Appliance

More generally, in embodiments in accordance with the present technology, ALA 115 is utilized to dynamically load a plurality of appliances onto a blade, thereby enabling a blade to serially run multiple appliances with different capabilities. This is advantageous because it allows customers to buy and load appliances with different features "off the shelf" without having to purchase a new blade.

Referring to FIG. 1, in one embodiment, appliance instruction receiver 120 receives one or more sets of appliance loading instructions 127 corresponding to one or more appliances, such as appliances 125a and 125b. For example, appliance instruction receiver 120 may receive one or more sets of appliance loading instructions 127 from user 132 that details the timing and content regarding the downloading of an appliance by ALA 115, the storing of the appliance on the blade, the installation of the appliance on the blade, and the booting of the appliance on the blade. Each set 130a and 130b of the one or more sets of appliance loading instructions 127 pertains to only one appliance. A set of appliance loading instructions itself may include one or more instructions.

Referring to FIG. 1, in one embodiment, appliance accessor 135 accesses one or more appliances, such as but not limited to appliances 125a and 125b. In another embodiment, appliance downloader 140 downloads one or more appliances, wherein each appliance of the one or more appliances has a capability different from each other. For example, appliance 125a may be a firewall software application, whereas appliance 125b may a software application for providing interface options.

Referring still to FIG. 1, in one embodiment, appliance storer 150 stores at first set of locations 155 on data store 110 the one or more appliances that were downloaded. For example, a set of appliance loading instructions 130a may direct appliance storer 150 to store appliance 125a at location 160a on data store 110. In another example, another set of appliance loading instructions 130b may direct appliance storer 150 to store appliance 125b at location 160b on data store 110. As stated herein, locations 160a and 160b each correspond to different appliances and occupy different spaces within data store 110.

Referring to FIG. 1, in one embodiment, appliance installer 165 installs at a second location 170 at data store 110 one of the appliances of the one or more appliances that were downloaded. For example, appliance 125a having been downloaded and stored at location 160a, may now be installed according to a set of appliance loading instructions 130a, at location 170. If appliance 125a is subsequently uninstalled, then appliance 125b having been downloaded and stored at location 160b, may be installed according to another set of appliance loading instructions 130b.

Referring to FIG. 1, in one embodiment, in response to instructions from a set of appliance loading instructions, appliance booter 180 boots onto blade 105 one of the appliances that is installed. For example, appliance booter 180 boots onto blade 105 appliance 125a that is installed at location 170.

Referring now to FIG. 2, in one embodiment, security module 200 performs a security check before the downloading of an appliance occurs. In one embodiment, a security check includes checking a signature of an appliance. Utilizing standard technology known in the art, various methods may be performed to authenticate the signature of the appliance and/or the identification of the user attempting to download the appliance to a blade. Additionally, before an appliance can be downloaded, it must be determined if the appliance is licensed and activated. This is done using standard techniques known in the art.

Referring to FIG. 2, in one embodiment ALA disabler 215 discontinues a run-time of ALA 115 after the booting of an appliance. For example, once ALA 115 boots appliance 125a, ALA disabler 215 acts to disable ALA 115 such that ALA 115 is no longer running. In other words, ALA 115, along with its operating system, is lying dormant.

However, in one embodiment, an appliance that is running on the blade to which ALA 115 is coupled, gives re-booting instructions to ALA 115, such that ALA 115 is allowed to re-boot and run once again. For example, an appliance such as 125a is able to give re-booting instructions because a piece of software was placed within appliance 125a that allows it to give re-booting instructions to ALA 115. Allowing re-booting of ALA 115 enables ALA 115 to download, store, install, and boot a new appliance, such as appliance 125b.

Referring to FIG. 2, in one embodiment, appliance uninstaller 220 uninstalls one or more appliances in response to receiving uninstall instructions. These uninstall instructions may originate from user 132. For example, appliance 125a may be running on blade 105. User 132 may give uninstall instructions to uninstall appliance 125a from blade 105. In response to these uninstall instructions, appliance uninstaller 220 uninstalls 125a from blade 105.

In another embodiment, once appliance 125a having a first capability is uninstalled, blade 105 may be re-purposed by installing and booting appliance 125b on blade 105. Appliance 125b has a capability different from appliance 125a's capability. A blade is re-purposed from its original state if it is enabled to perform a function different from its original function. In other words, adding a new capability to a blade results in a re-purposing of the blade.

Figure 3:
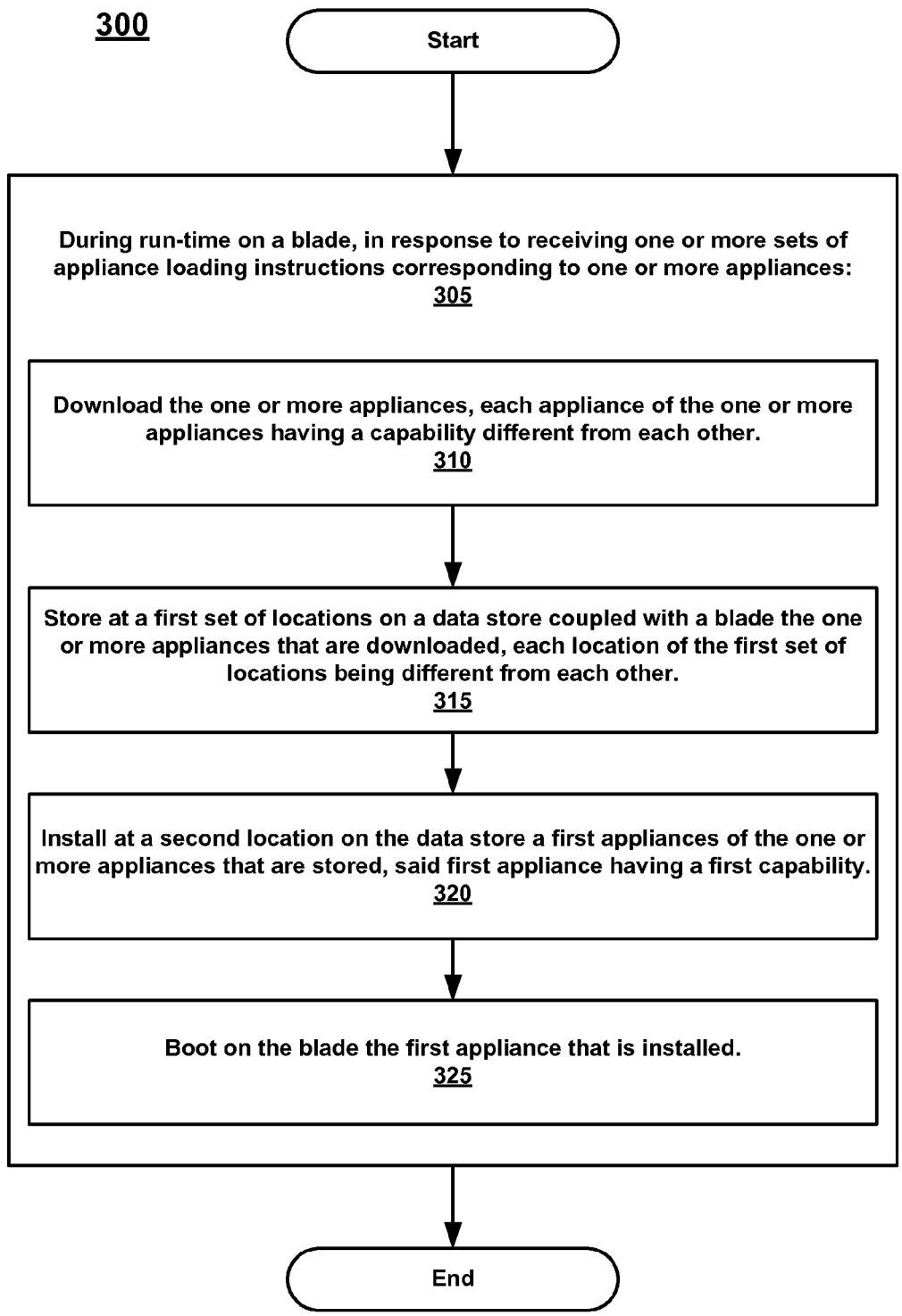
FIG. 3 is a flowchart of an example method for enabling a plurality of appliances to be dynamically loaded onto a blade, in accordance with embodiments of the present technology.

Referring now to 300 of FIG. 3, a flowchart of an example computer-implemented method for enabling a plurality of software appliances to be dynamically loaded onto a blade, in accordance with embodiments of the present technology is shown.

Referring to 305 of FIG. 3 and as described herein, in one embodiment of the present technology, during run-time on blade 105, in response to receiving one or more sets of appliance loading instructions 127 corresponding to one or more appliances 125a and 125b, one or more appliances 125a and 125b are downloaded. Each appliance of one or more appliances 125a and 125b has a capability different from each other.

Referring to 310 of FIG. 3 and as described herein, in one embodiment of the present technology, during run-time on blade 105, in response to receiving one or more sets of appliance loading instructions 127 corresponding to one or more appliances 125a and 125b, one or more appliances 125a and 125b are stored at first set of locations 155 on data store 110. Each location 160a and 160b is different from each other.

Referring to 315 of FIG. 3 and as described herein, in one embodiment of the present technology, during run-time on blade 105, in response to receiving one or more sets of appliance loading instructions 127 corresponding to one or more appliances 125a and 125b, one 125a of the one or more appliances 125a and 125b that are stored at first set of locations 155 is installed at second location 170 on data store 110. Location 170 is different from first set of locations 155.

Referring to 320 of FIG. 3 and as described herein, in one embodiment of the present technology, during run-time on blade 105, in response to receiving one or more sets of appliance loading instructions 127 corresponding to one or more appliances 125a and 125b, appliances 125a that is installed at second location 170 is booted on blade 105.

Example Computer System Environment

Figure 4:
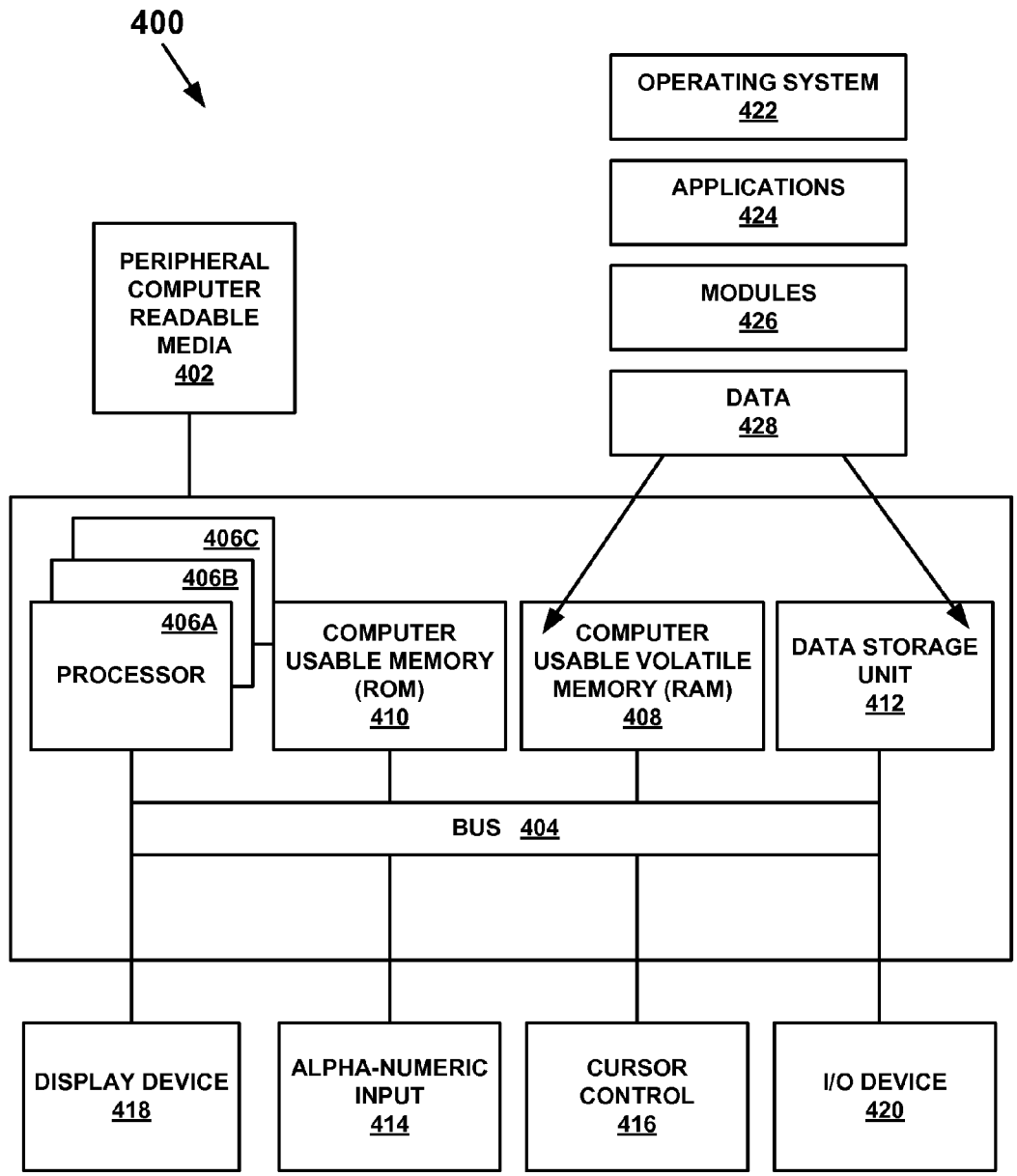
FIG. 4 is a diagram of an example computer system enabling a plurality of appliances to be dynamically loaded onto a blade, in accordance with embodiments of the present technology.

FIG. 4 illustrates an example computer system 400 used in accordance with embodiments of the present technology. It is appreciated that system 400 of FIG. 4 is an example only and that embodiments of the present technology can operate on or within a number of different computer systems including general purpose networked computer systems, embedded computer systems, routers, switches, server devices, user devices, various intermediate devices/artifacts, stand alone computer systems, and the like. As shown in FIG. 4, computer system 400 of FIG. 4 is well adapted to having peripheral computer readable media 402 such as, for example, a compact disc, and the like coupled therewith.

System 400 of FIG. 4 includes an address/data bus 404 for communicating information, and a processor 406A coupled to bus 404 for processing information and instructions. As depicted in FIG. 4, system 400 is also well suited to a multi-processor environment in which a plurality of processors 406A, 406B, and 406C are present. Conversely, system 400 is also well suited to having a single processor such as, for example, processor 406A. Processors 406A, 406B, and 406C may be any of various types of microprocessors, but all would be of the same type of microprocessor. System 400 also includes data storage features such as a computer usable volatile memory 408, e.g. random access memory (RAM), coupled to bus 404 for storing information and instructions for processors 406A, 406B, and 406C.

System 400 also includes computer usable non-volatile memory 410, e.g. read only memory (ROM), coupled to bus 404 for storing static information and instructions for processors 406A, 406B, and 406C. Also present in system 400 is a data storage unit 412 (e.g., a magnetic or optical disk and disk drive) coupled to bus 404 for storing information and instructions. System 400 also includes an optional alpha-numeric input device 414 including alphanumeric and function keys coupled to bus 404 for communicating information and command selections to processor 406A or processors 406A, 406B, and 406C. System 400 also includes an optional cursor control device 416 coupled to bus 404 for communicating user input information and command selections to processor 406A or processors 406A, 406B, and 406C. System 400 also includes an optional display device 418 coupled to bus 404 for displaying information.

Referring still to FIG. 4, optional display device 418 of FIG. 4 may be a liquid crystal device, cathode ray tube, plasma display device or other display device suitable for creating graphic images and alpha-numeric characters recognizable to a user. Optional cursor control device 416 allows the computer user to dynamically signal the movement of a visible symbol (cursor) on a display screen of display device 418. Many implementations of cursor control device 416 are known in the art including a trackball, mouse, touch pad, joystick or special keys on alpha-numeric input device 414 capable of signaling movement of a given direction or manner of displacement. Alternatively, it will be appreciated that a cursor can be directed and/or activated via input from alphanumeric input device 414 using special keys and key sequence commands.

System 400 is also well suited to having a cursor directed by other means such as, for example, voice commands. System 400 also includes an I/O device 420 for coupling system 400 with external entities.

Referring still to FIG. 4, various other components are depicted for system 400. Specifically, when present, an operating system 422, applications 424, modules 426, and data 428 are shown as typically residing in one or some combination of computer usable volatile memory 408, e.g. random access memory (RAM), and data storage unit 412. However, it is appreciated that in some embodiments, operating system 422 may be stored in other locations such as on a network or on a flash drive; and that further, operating system 422 may be accessed from a remote location via, for example, a coupling to the internet. In one embodiment, the present invention, for example, is stored as an application 424 or module 426 in memory locations within RAM 408 and memory areas within data storage unit 412.

Computing system 400 is only one example of a suitable computing environment and is not intended to suggest any limitation as to the scope of use or functionality of embodiments of the present technology. Neither should the computing environment 400 be interpreted as having any dependency or requirement relating to any one or combination of components illustrated in the example computing system 400.

Embodiments of the present technology may be described in the general context of computer-executable instructions, such as program modules, being executed by a computer. Generally, program modules include routines, programs, objects, components, data structures, etc., that perform particular tasks or implement particular abstract data types. Embodiments of the present technology may also be practiced in distributed computing environments where tasks are performed by remote processing devices that are linked through a communications network. In a distributed computing environment, program modules may be located in both local and remote computer-storage media including memory-storage devices.

Figure 5:
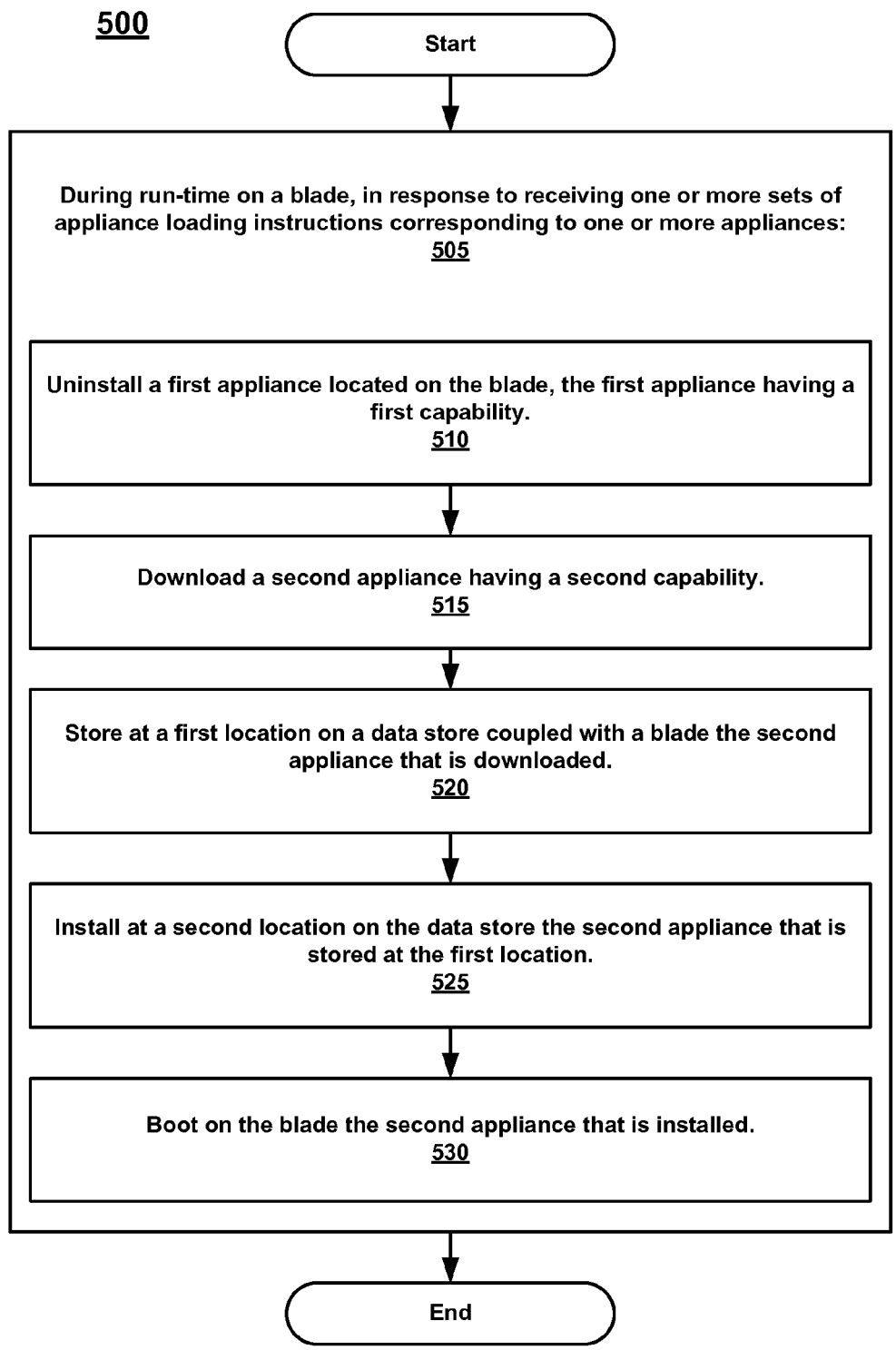
FIG. 5 is a flowchart of an example method for enabling a plurality of appliances to be dynamically loaded onto a blade, in accordance with embodiments of the present technology.

FIG. 5 is a flowchart of an example method for enabling a plurality of appliances to be dynamically loaded onto a blade, in accordance with embodiments of the present technology. In one embodiment, process 500 is carried out by processors and electrical components under the control of computer readable and computer executable instructions. The computer readable and computer executable instructions reside, for example, in data storage features such as computer usable volatile and non-volatile memory. However, the computer readable and computer executable instructions may reside in any type of computer readable medium. In one embodiment, process 500 is performed by ALA 115 of FIG. 1.

Referring to 505 and 510 of FIG. 5, in one embodiment and as described herein, during run-time on blade 105, in response to receiving one or more sets of appliance loading instructions 127 corresponding to one or more appliances 125*a* and 125*b*, a first appliance 125*a* on blade 105 is uninstalled, wherein first appliance 125*a* has a first capability.

Referring to 515 of FIG. 5, in one embodiment and as described herein, second appliance 125*b* having a second capability is downloaded. Referring to 520 of FIG. 5 and as described herein, second appliance 125*b* that is downloaded is then stored at first location 160*a* on data store 110 coupled with blade 105.

Referring to 525 of FIG. 5, in one embodiment and as described herein, second appliance that is stored at first location 160*a* is installed at second location 170 on data store 110.

Referring to 530 of FIG. 5, in one embodiment and as described herein, second appliance 125*b* that is installed at second location 170 is booted on blade 105.

Thus, embodiments of the present technology enable the serial running of a plurality of appliances on a single blade, thereby reducing blade inventory and conserving resources. Additionally, due to the ability to re-purpose a blade, waste is reduced.

Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method for enabling a plurality of appliances to be dynamically loaded onto a blade, said method comprising:
during run-time on a blade, in response to receiving, at an appliance loading appliance, one or more sets of appliance loading instructions corresponding to one or more appliances, said appliance loading appliance performs the following:
downloading said one or more appliances, each appliance of said one or more appliances having a capability different from each other;
storing at a first set of locations on a data store said one or more appliances that are downloaded, each location of said first set of locations being different from each other;
installing at a second location on said data store a first appliance of said one or more appliances that are stored, said first appliance having a first capability;
booting on said blade, at said second location, said first appliance that is installed; and
after said booting said first appliance at said second location, discontinuing, by an appliance loading appliance disabler, said run-time of said appliance loading appliance, such that said appliance loading appliance and an operating system of said appliance loading appliance is lying dormant while said first appliance continues to run on said blade.

2. The method of claim 1, further comprising:
re-booting in response to receiving re-booting instructions from said first appliance that is running on said blade.

3. The method of claim 1, further comprising:
in response to receiving appliance uninstall instructions, uninstalling said first appliance that is installed.

4. The method of claim 1, wherein said downloading comprises:
re-purposing said blade by booting a second appliance having a second capability different from said first capability of said first appliance.

5. The method of claim 1, further comprising:
before said downloading said one or more appliances, performing a security check.

6. The method of claim 5, comprising:
checking a signature of said one or more appliances.

7. The method of claim 1, further comprising:
utilizing a hard disk drive as said data store.

8. The method of claim 1, further comprising:
utilizing a flash memory as said data store.

9. An appliance loading appliance for enabling a plurality of appliances to be dynamically loaded onto a blade, said appliance loading appliance comprising:

an appliance instruction receiver coupled with a computer, said appliance instruction receiver configured for receiving one or more sets of appliance loading instructions corresponding to one or more appliances;

an appliance accessor coupled with said computer, said appliance accessor configured for accessing said one or more appliances;

an appliance downloader coupled with said computer, said appliance downloader configured for downloading said one or more appliances, each appliance of said one or more appliances having a capability different from each other;

an appliance storer coupled with said computer, said appliance storer configured for storing at a first set of locations on a data store said one or more appliances that are downloaded, each location of said first set of locations being different from each other, said data store coupled with said blade;

an appliance installer coupled with said computer, said appliance installer configured for installing at a second location on said data store a first appliance of said one or more appliances that are stored;

an appliance booter coupled with said computer, said appliance booter configured for booting on said blade said first appliance that is installed at said second location; and an appliance loading appliance disabler coupled with said computer, said appliance loading appliance disabler configured for, after said booting said first appliance at said second location, discontinuing a run-time of said appliance loading appliance, such that said appliance loading appliance and an operating system of said appliance loading appliance is lying dormant while said first appliance continues to run on said blade.

10. The appliance loading appliance of claim 9, wherein said data store is a hard disk drive.

11. The appliance loading appliance of claim 9, further comprising:
a security module coupled with said computer, said security module configured for performing a security check before said downloading is performed.

12. The appliance loading appliance of claim 9, further comprising:
an appliance uninstaller coupled with said computer, said appliance uninstaller configured for uninstalling said first appliance in response to receiving uninstall instructions.

13. A non-transitory computer usable storage medium comprising instructions that when executed cause a computer system to perform a method for enabling a plurality of appliances to be dynamically loaded onto a blade, said method comprising:
during run-time on a blade, in response to receiving, at an appliance loading appliance, one or more sets of appliance loading instructions corresponding to one or more appliances:
uninstalling a first appliance located on said blade, said first appliance having a first capability;
downloading a second appliance having a second capability;
storing at a first location on a data store coupled with said blade said second appliance that is downloaded;
installing at a second location on said data store said second appliance that is stored;
booting onto said blade said second appliance that is installed at said second location; and
after said booting said first appliance at said second location, discontinuing, by an appliance loading appliance disabler, said run-time of said appliance loading appliance, such that said appliance loading appliance and an operating system of said appliance loading appliance is lying dormant while said first appliance continues to run on said blade.

14. The method of claim 13, further comprising:
before said downloading said second appliance, performing a security check.

15. The method of claim 13, further comprising:
re-booting in response to re-booting instructions from said second appliance running on said blade.

16. The method of claim 13, further comprising:
utilizing a hard disk drive as said data store.

* * * * *